United States Patent [19]

Underwood et al.

[11] 4,181,940

[45] Jan. 1, 1980

[54] MULTIPROCESSOR FOR PROVIDING FAULT ISOLATION TEST UPON ITSELF

[75] Inventors: Thomas E. Underwood, Edgewater; James J. Holden, III, Catonsville, both of Md.

[73] Assignee: Westinghouse Electric Corp., Pittsburgh, Pa.

[21] Appl. No.: 882,030

[22] Filed: Feb. 28, 1978

[51] Int. Cl.² .............................................. G06F 11/04
[52] U.S. Cl. ..................................... 364/200; 235/304
[58] Field of Search ...................... 364/200; 235/303.4, 235/304

[56] References Cited

U.S. PATENT DOCUMENTS

| | | | |
|---|---|---|---|
| 3,787,816 | 1/1974 | Hauck et al. | 235/303.4 X |
| 3,814,919 | 6/1974 | Repton et al. | 364/200 X |

FOREIGN PATENT DOCUMENTS 1181184  2/1970  United Kingdom ................. 235/303.4

OTHER PUBLICATIONS

Hufferd, "Reliability in Multiprocessors Through Swapping Status of a Failing CPU Alternately with Status of Non-Failing CPU", *IBM Tech. Disclosure Bulletin*, vol. 14, No. 7, Dec. 1971, pp. 1968-1970.
Cook et al., "Design of a Self-Checking Micro-Program Control,", *IEEE Trans. on Computers*, vol. C-22, No. 3, Mar. 1973, pp. 255-262.

*Primary Examiner*—David H. Malzahn
*Attorney, Agent, or Firm*—R. M. Trepp

[57] ABSTRACT

An improved multiprocessor system for providing fault isolation test upon itself is described incorporating at least a first and second digital processor, a first, second and third memory and means for switching in one memory in place of another. In addition, methods are provided for fault isolation test in a multiprocessor system and for protecting the contents of one or more selected memories.

9 Claims, 4 Drawing Figures

MULTIPROCESSOR FOR PROVIDING FAULT ISOLATION TEST UPON ITSELF

GOVERNMENT CONTRACT

The invention herein-described was made in the course of or under a contract or subcontract thereunder with the Department of the Air Force.

BACKGROUND OF THE INVENTION

1. Field of the Invention

This invention relates to a multiprocessor system, particularly to providing fault isolation test upon itself by means of switching in one memory in place of another.

2. Description of the Prior Art

In the prior art, a multiprocessor system may be maintained by having off-line test equipment and a test console for checking out the multiprocessor system as a whole and each of its components or units such as a processor, program memory, data memory, an interconnecting bus and input/output unit. The test console may contain lights to indicate the status of various units or a typewriter which would print messages to indicate the status of various units. The units themselves could be replaced or further diagnostic testing could be provided to isolate errors to a particular group of subassemblies or printed circuit boards comprising the unit which could then be replaced. The test equipment may for example include a processor and memory for storing programs and executing test programs designed to verify correct operation of the multiprocessor system and its various units. In addition, subsequent tests could be run to provide fault isolation to locate the source of errors arising from the test.

Another method for testing a multiprocessor system to verify proper operation of the multiprocessor system was to have each processor within the multiprocessor system run a test on itself by means of a test program and to display the results of the test program in a display unit. A common problem with this form of test is that the computer running the test upon itself had a fault of a nature which rendered the computer incompetent to display the results of the test on a display. In this case, the processor was deemed faulty and replaced by another processor with the faulty processor removed and tested off line by special test equipment.

In a multiprocessor system having a plurality of program memories and a plurality of processors where each processor could address any one of the program memories, test programs run by a particular processor would invariably result in rewriting or wiping out the test program stored in one of the program memories. The loss of the program memory (test) or loss in the test program integrity resulted in destruction of the information stored in the program memories such as the start-up program and monitoring data which would help fault isolation tests. The necessary start-up program for the multiprocessor system would have to be reloaded into the program memory to permit the start-up of the multiprocessor system. The protection of the start-up program is vital since to make repairs on the multiprocessor system, the power would be turned off to enable replacement of printed circuit boards or subassemblies into the multiprocessor system. Furthermore, during test program operation or otherwise the power to the multiprocessor system may be unintentionally lost due to a power transient. It is understood that the program memories would have proper power sequencing to preserve the data or information stored in the program memories upon loss of power. While the information is preserved in the program memories, the problem is to start-up the processors with the correct initial conditions and with preliminary checks to insure that the multiprocessor system is viable, from a minimum operational level standpoint. Improper start-up of the multiprocessor system may result in destruction of the information and program memory prior to running of fault isolation test programs.

It is therefore desirable to have a tightly-controlled master and slave relationship between two processors to isolate faults in the slave processor.

It is further desirable to have a technique for switching the memory containing the power restart logic off line to protect it and to replace it with a scratchpad memory so the slave instruction counter of the slave processor addresses the scratch memory without exercising any of its processor hardware.

SUMMARY OF THE INVENTION

In accordance with the present invention, a method and apparatus is provided for providing a multiprocessor system with means for performing fault isolation test upon one of its processors comprising a first and second digital processor having a plurality of registers including an instruction register, an instruction set including at least add, subtract, load, store, NAND, input, output, conditional branch and shift instructions for operating upon data stored in a memory in accordance with the particular instruction in said instruction register, an input/output port responsive to control signals including halt, initiate clear and interrupt commands, and having at least one port for transferring data and instructions, a first, second and third memory capable for storing a plurality of instructions and data coupled to a transfer switch, the transfer switch including means for switching the third program memory in place of the first program memory to cause the first program memory to be inaccessible to the first and second digital processor to protect the integrity of the information stored in the first program memory and including means for addressing the third program memory by the address of the third program memory and of the first program memory.

The present invention further provides a method for performing fault isolation test on a processor in a multiprocessor system comprising the steps of halting and clearing the processor under test, switching in a first program memory in place of a second program memory containing start-up information, writing a test program into said first program memory, initiating the processor under test, comparing the data in the first memory with first predetermined data to detect an error, upon detection of an error, comparing the data in the first memory with additional predetermined data to determine the location of a processor fault capable of causing the error, and generating a predetermined signal indicative of the location of the fault.

DESCRIPTION OF THE PREFERRED EMBODIMENTS

Figure 1:
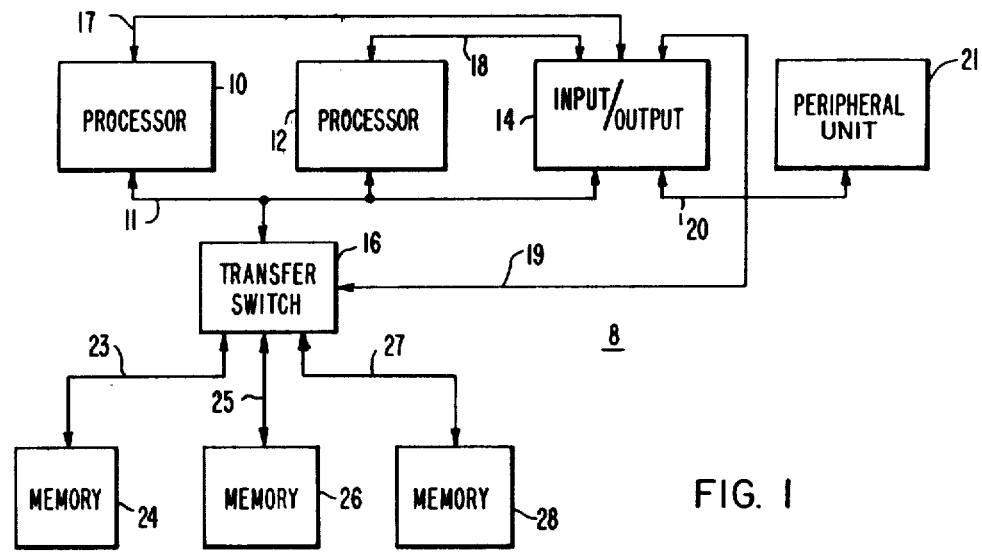
FIG. 1 is one embodiment of the invention.

Referring now to the drawings, FIG. 1 shows one embodiment of the invention. Processors 10 and 12 of multiprocessor 8 are coupled over line 11 to input/output 14 and transfer switch 16. Line 11 functions to carry instructions and data, for example in the form of digital words, to and from processors 10 and 12, input/output 14 and transfer switch 16. Processor 10 does not communicate directly with processor 12. Communication between processors is accomplished by placing instructions or data in either the input/output 14 or one of memories 24, 26, and 28. Then the recipient processor is initiated through input/output 14 to access the instructions or data. An input/output port of processor 10 is coupled over line 17 to a control input of input/output 14. An input/output port of processor 12 is coupled over line 18 to a control input of input/output 14. A control port of input/output 14 is coupled over line 19 to a control port of transfer switch 16. Lines 17 and 18 are bidirectional and function to transfer commands such as initiate, halt, clear, and interrupt to and from processors 10 and 12. In addition, lines 17 and 18 carry commands such as "who am I", memory switching and memory protection. Line 19 is bidirectional and carries memory switching and memory protection commands to and from transfer switch 16. Input/output 14 is also coupled over line 20 to peripheral unit 21 which may be, for example, a utilization device for utilizing the data on line 20 from multiprocessor 8. Line 20 functions to carry information to and from input/output 14 such as instruction words and data. Peripheral unit 21 may also receive a predetermined signal from multiprocessor 8 indicative of the location of a halt within a processor.

Transfer switch 16 is coupled over line 23 to memory 24. Transfer switch 16 is coupled over line 25 to memory 26. Transfer switch 16 is coupled over line 27 to memory 28. Lines 23, 25 and 27 are bidirectional for transferring information such as data and instructions to and from transfer switch 16. Multiprocessor 8 includes processor 10 and 12, input/output 14, transfer switch 16 and memories 24, 26 and 28.

Processors 10 and 12 have a plurality of registers including an instruction accumulator, multiplier quotient, index, effective address, instruction counter, instruction, instruction buffer, memory operand, instruction register save, operation counter, block (MSB of address), and carry overflow registers. Processors 10 and 12 have an instruction set which includes at least an add, NAND, subtract, load, store, input, output, conditional branch and shift instructions for operating upon data transferred to the processor over line 11 in accordance with the particular instruction in the instruction register of the processor. Processors 10 and 12 each have an input/output port responsive to control signals including halt, initiate, clear and interrupt. Processors 10 and 12 can access memories 24, 26 and 28 for both operand and instruction fetches. In addition, each processor has two methods of controlling any other processor by means of input/output 14. One method is a control signal or command from input/output 14 over lines 17 or 18 which can halt, clear, or initiate a desired processor. The second method is by use of software-controlled interrupts through input/output 14. Thus, one processor can execute a program which will clear another processor, i.e., reset all registers in the cleared processor to zero, or initiate it which causes an instruction to be fetched and executed. A processor which is halted, responds to an initiate command by fetching and executing one instruction only. A processor which is not halted responds to an intiate command by continuing to fetch and execute instructions with no further external stimuli required. Thus, by halting a processor, another processor can cause it to step through a program in a single-step mode by generating a series of initiate pulses or commands during the presence of a halt command. Alternatively, one processor can cause another processor to step through a program in single-step mode by utilizing an interrupt instruction. The use of the interrupt instruction, however, requires most of the control logic in the processor and therefore may not work or be capable of working if a fault exists in the control logic. By utilizing the initiate and halt commands, a minimum of hardware logic in the processor being tested (slave) is necessary to execute test programs and thereby permit fault isolation testing to a finer resolution.

Processors 10 and 12 include, for example, means for resetting all registers to zero in response to a clear control signal received on line 17 or 18. Processors 10 and 12 include, for example, means for causing an instruction to be fetched and executed in response to an initiate control signal received on line 17 or 18. Processors 10 and 12 include, for example, means for halting the fetching and execution of instructions in response to a halt control signal received on line 17 or 18. In addition, processors 10 and 12 include for example, means for fetching and the execution of one instruction only in response to concurrent initiate and halt control signals.

Input/output 14 includes logic for receiving, decoding and generating initiate, halt, clear and interrupt commands and for receiving and decoding "who am I" interrogations from the processors, memory switching and memory protection commands. In addition, input/output 14 provides memory switching and memory protection commands to transfer switch 16.

Transfer switch 16 includes means for switching a memory in place of another such as memory 28 in place of memory 24 to cause memory 24 to be inaccessible by processors 10 and 12 to protect the integrity of the information stored in memory 24. The means for switching also includes means for addressing the switched-in memory such as memory 28 by its own address and by the address of the memory it replaced, memory 24. The transfer switch further includes means for protecting the information in a selected memory such as memories 24 and 26 by inhibiting "write" operations while permitting information to be read from these memories. One memory is switched in place of annother under the memory switching command from input/output 14 over line 19. Selected memories are protected by a memory protect command from input/output 14 over line 19.

Memories 24, 26 and 28 may for example be program memories implemented with conventional technology such as non-volatile magnetic core memories. A portion of memories 24, 26 and 28 may be uttilized as data memories. Auxiliary data memories not shown, may be added and coupled to transfer switch 16. One example of a data memory may, for example, be a volatile semiconductor memory.

In FIG. 1, one of the program memories is a redundant or stand-by memory which may be switched under program control such as by a memory switching command from input/output 14 to respond in the place of either memory 24 or 26. When the memory switching has taken place, memory request for the switched-out memory or replaced memory are rerouted to the redundant memory or switched-in memory, for example, memory 28. The switched-out memory for example, memory 24, is completely inaccessible for read or write operations, etc. from processors 10 and 12 and the contents of the switched-out memory remain unchanged. When memory 28 is switched in for one of the other two program memories, 24 or 26, memory 28 can be accessed by both its own address and also by the address of the memory which it replaced. The memory switching or the substitution of one memory for another, once accomplished by transfer switch 16, is completely invisible to programs being executed by processors 10 and 12. In other words, once memory switching has occured, processors 10 and 12 are unable to detect that the memories have been switched except by interrogation of the input/output 14.

Under program control by one of the processors, selected memories such as memories 24 and 26 may be individually protected against unintended write request. If a write is attempted in a protected memory, the write operation is not performed, and an error condition is flagged, and the processor which attempted the write operation remains hung up until either the memory is unprotected by means of input/output 14 or the processor is cleared by means of input/output 14.

If power transients occur or when power is interrupted intentionally, sequencing circuitry in input/output 14 detects the resumption of normal power supply conditions and automatically clears and initiates the processors 10 and 12. Any memory redundancy switching which may have occurred previously is restored to its nominal or unswitched state.

When processors 10 and 12 are cleared such as after power turn-on, processors 10 and 12 begin executing instructions starting from the same location in a program memory such as location 0 in memory 24. Processors 10 and 12 initially execute the same program. Processors 10 and 12 can be directed to separate programs through the use of hardware conditional branch instructions utilizing input/output 14.

When power transients or normal power turn on occurs, input/output 14 automatically causes all program memories to be protected such as memories 24, 26 and 28.

Figure 2:
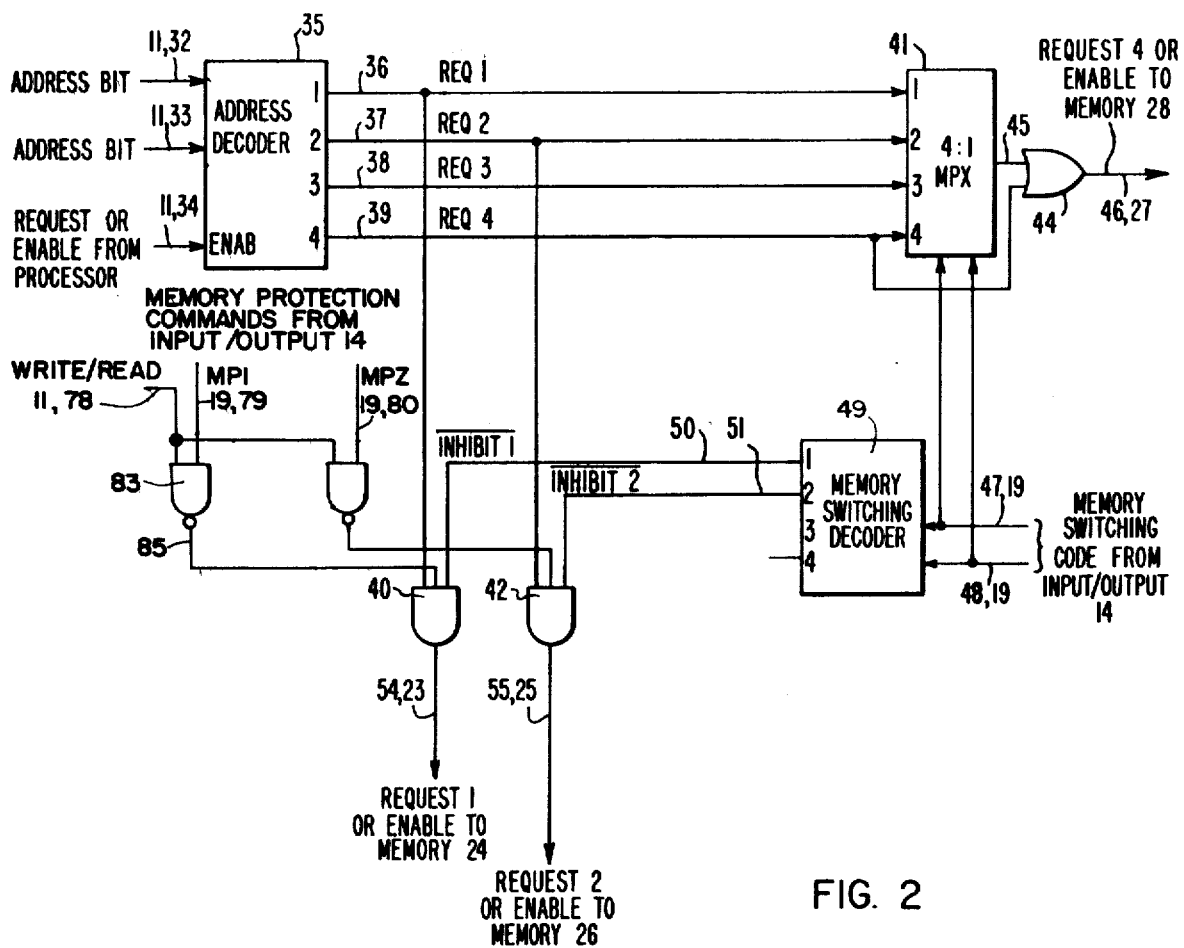
FIG. 2 is a larger diagram implementing a portion of the transfer switch.

FIG. 2 shows a logic diagram implementing a portion of transfer switch 16. More specifically, FIG. 2 shows request control logic for routing a request to a memory prior to memory switching and for routing the request to the switched-in memory after memory switching. If a processor requests information from a memory, the processor sends the address and a request from the processor on line 11 to transfer switch 16. A portion of the address field on line 11 such as two bits on lines 32 and 33 and the request signal from the processor on line 34 are coupled to address decoder 35. Address decoder 35 treats the request on line 34 as an enable to address decoder 35. Address decoder 35 decodes the digital levels on lines 32 and 33 to provide a signal on one of the four outputs lines 36 through 39 of address decode 35. The output on one of lines 36 through 39 represents which memory such as memories 24, 26 and 28 out of a possible 4 was selected by the address signals on lines 32 and 33. Line 36 is coupled to an input of AND gate 40 and an input of 4:1 multiplexer 41. Line 37 is coupled to an input of AND gate 42 and to an input of 4:1 multiplexer 41. Line 38 is coupled to an input of 4:1 multiplexer 41. Line 39 is coupled to an input of 4:1 multiplexer 41 and to an input of OR gate 44. The output of 4:1 multiplexer 41 is coupled over line 45 to an input of OR gate 44. The output of OR gate 44 is coupled over line 46 to the memory available to be switched in place of another such as memory 28. The signal on line 46 acts as a request to memory 28 or an enable to memory 28 to cause it to retrieve information in accordance with the remainder of the address field on line 27 (see FIG. 1). Line 46 may be apart or one signal being transmitted over line 27. Memory switching command signals from input/output 14 are coupled over line 19 to transfer switch 16 (see FIG. 1) which may include signals on lines 47 and 48 (see FIG. 2) which are coupled to inputs of memory switching decoder 49 and to control inputs of 4:1 multiplexer 41 (see FIG. 2). Memory switching decoder 49 functions to decode the signals on lines 47 and 48 to provide a signal to inhibit the request to a particular memory being switched out. 4:1 multiplexer 41 functions to decode the signals on lines 47 and 48 to reroute the request to a switched-out memory to the memory to be switched-in such as memory 28. An output of memory switching decoder 49 is coupled over line 50 to an input of AND gate 40. A second output of memory switching decoder 49 is coupled over line 51 to an input of AND gate 42. The code on lines 47 and 48 from input/output 14 determine which memory is replaced by memory 28. The output of AND gate 40 is coupled over line 54 (see FIG. 2) which is one of the signals on line 23 to memory 24 (see FIG. 1). The output of AND gate 42 is coupled over line 55 which is one of the signals on line 25 to memory 26. The signals on line 54 and 55 act as enable signals to the memory that they are coupled to. In the more general sense, it could be designated as request 1 and request 2 to memory modules 1 and 2.

Figure 3:
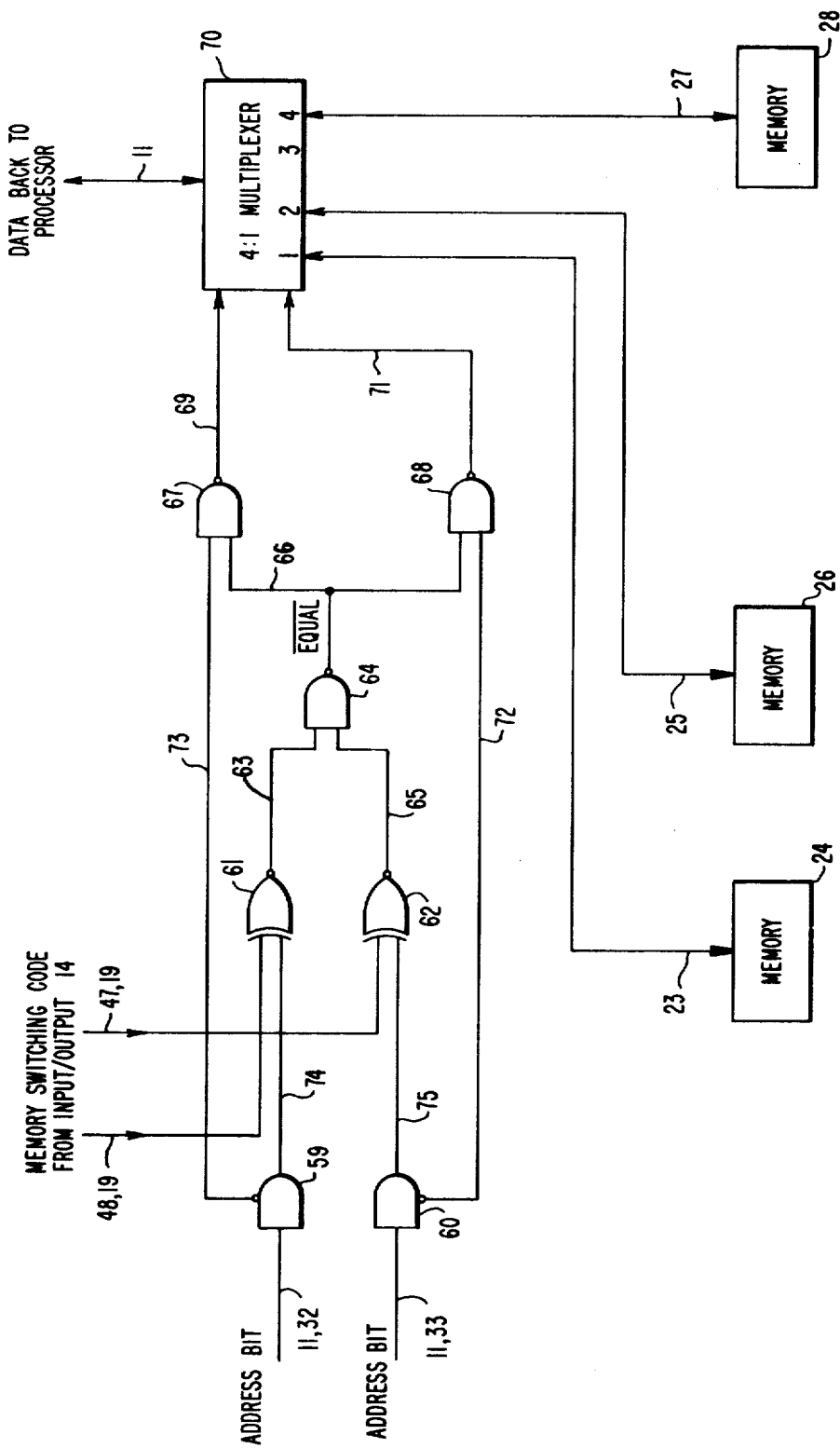
FIG. 3 is a large diagram implementing another portion of the transfer switch.

FIG. 3 shows a logic diagram implementing another portion of the transfer switch 16. FIG. 3 in particular shows control logic to steer data from a switched-in memory in place of another memory to either processor 10 or 12 over line 11. Address signals on lines 32 and 33 are coupled to inputs of gates 59 and 60, respectively. A true output of gate 59 is coupled over line 74 to an input of exclusive NOR gate 61. The true output of gate 60 is coupled over line 75 to an input of exclusive NOR gate 62. Line 48 is coupled to a second input of exclusive NOR gate 61 and line 47 is coupled to a second input of exclusive NOR gate 62. Lines 48 and 47 being carried over line 19 as shown in FIG. 1 from input/output 14. Lines 47 and 48 contain the memory switching code from input/output 14 and are also shown in FIG. 2. The output of exclusive NOR gate 61 is coupled over line 63 to an input of NAND gate 64. The output of exclusive NOR gate 62 is coupled over line 65 to an input of NAND gate 64. The complement output of gate 64 is coupled over line 66 to an input of NAND gate 67 and 68. An output of gate 67 is coupled over line 69 to a control input of 4:1 multiplexer 70. An output of gate 68 is coupled over line 71 to a control input of 4:1 multiplexer 70. A complement output of gate 60 is coupled over line 72 to an input of NAND gate 68. A complement output of gate 59 is coupled over line 73 to an input of NAND gate 67.

Memory 24 is coupled over line 23 to an input of 4:1 multiplexer 70. Memory 26 is coupled over line 25 to an input of 4:1 multiplexer 70. Memory 28 is coupled over line 27 to an input of 4:1 multiplexer 70. 4:1 multiplexer 70 functions to switch in the data from the memory switched in place of another and to present the data on line 11.

In operation of the logic of FIGS. 2 and 3 which function to replace one memory by another is described as follows. The code on lines 47 and 48 identify the memory that is replaced by the switched-in memory. The code steers the memory request to the switched-in memory and inhibits the request to the memory being replaced. Referring to FIG. 2, the upper bits of the memory address are decoded to determine which memory to request. One of the three signals request 1, request 2, or request 4 will be activated. If no memory is desired to be switched in place of another, the code on lines 47 and 48 will be set to (1,1). Therefore, requests to memory 28 are generated only if the processor addresses memory 28. If, however, memory 28 is desired to be switched in place of memory 24, the code on lines 47 and 48 is set to 0 (0,0). The code causes the multiplexer to select request 1 and sends it to memory 28 by way of line 46 as an enable or memory request. Memory switching decoder 49 causes a logic 0 to exist on "INHIBIT 1" which inhibits request 1 from being sent to memory 24. Thus, memory 28 is requested and memory 24 is not. The data from memory 28 is steered back to the processor as shown in FIG. 3. The code on lines 47 and 48 and the upper bits of the memory address are compared with exclusive NOR gates. If they are identical, then the memory requested is the one memory 28 should replace and the multiplexer select code is (1,1). 4:1 multiplexer 70 causes the data from memory 28 to be routed through multiplexer 70 and sent back to the requesting processor over line 11.

If the CPU address or memory address and the memory switching code do not agree, then the signal "EQUAL" is a logic 1 and the select code sent to multiplexer 70 is equal to the upper address bits from the processor. Thus, if the processor requests memory 24 when the memory switching code has been previously set to 0 (0,0), the request is rerouted to memory 28 and the request to memory 24 is inhibited. The data for memory 28 is sent back to the processor over line 11. The operation of memory switching when completed is completely invisible to the program being executed by the processor.

The multiprocessor 8 shown in FIG. 1 has been developed to perform automatic fault isolation test (FIT) on one processor such as processor 10 by another processor such as processor 12. The processor under test is designated the slave while the processor performing the test is designated the master. The hardware configuration of multiprocessor 8 permits two primary goals to be successfully attained: effective isolation of a single fault in a processor and maintaining program integrity during fault isolation testing (FIT). The success of these two goals has been empirically versified by a nearly exhaustive set of injected faults. The results showed that over 99% of all faults injected in a processor were isolated and the control program remained intact throughout all faults. The advantage of the apparatus and method described herein is that a multiprocessor system can diagnose and isolate the cause of signal failures within each processor without the aid of external test equipment and employing a low skill level technician. The instant invention overcomes one of the most serious problems encountered when attempting fault isolation test in a processor of a multiprocessor system, the inadvertent destruction of the control program controlling the test by the faulty processor being tested.

A method for operating the multiprocessor system 8 and for performing fault isolation tests on a processor within multiprocessor system 8 begins by selecting one processor as a good processor or as a fault isolation test control processor (master) such as processor 12. The good processor may be selected by investigating on line fault detection information supplied by the operational program. A suspect processor or the processor to be tested (slave) is selected. Before beginning the actual testing of the slave such as processor 10, the master first takes steps to insure program integrity. The message generation and power-up restart programs reside in one of the program memories such as memory 24. And the fault isolation test (FIT) control program is resident in another memory such as memory 26. Memories 24 and 26 are then protected by means of a memory protect signal from input/output 14 to protect memories 24 and 26 from any write operations. Memory 26 may also include an area for data such as control variables. Next, the master executes instructions attained from the FIT control program in memory 26 and directs through input/output 14 a memory switching signal to transfer switch 16 to switch in memory 28 in place of memory 24. By switching memory 28 in place of memory 24, two objectives are accomplished. Memory 24 is no longer accessible by any processor in the event of a protect error or lack of a protect signal and memory 28 now responds to addresses directed to memory 24. By having memory 28 respond to addresses directed to memory 24, memory addresses such as a reference to address 0 are now references to address 0 in memory 28 rather than memory 24, address 0. With memory 28 switched in for memory 24, the configuration of multiprocessor 8 in FIG. 1 is the FIT test configuration and program integrity of memories 24 and 26 is guaranteed.

The FIT control method consists of the master exercising control of the slave by means of halt, clear, initiate and interrupt commands sent via input/output 14 causing the slave to execute test programs. These test programs are generated by the master and are stored in memory 28 beginning at address 0. In this way, when the slave is cleared, the slave instruction counter (IC) is 0, pointing to the start of the test program. The tests are designed in a building block fashion, such that the first test requires as little slave hardware as possible to pass; the second test requires as little additional slave hardware as possible; etc. This technique provides further protection for the control program in memory 26 since the slave is under strict control of the master and does not exercise complicated hardware and software functions until confidence in the slave's operational capability has been built up. This method also allows for better isolation of the fault source.

After each test, the master monitors the slave's performance by use of either memory addresses or I/O registers. If the results are correct, the master proceeds to set up the next slave test. If a failure is detected, the master may set up more tests for the slave to perform to better isolate the fault source or may go directly to the generation of repair action messages. In order to generate the messages, memory 24 must be made available. The master clears the slave, unprotects memories 24, 26 and 28 and switches memory 24 back on line by means of a memory switching command from input/output 14 and proceeds to the message generation programs. If multiprocessor 8 is in the FIT test configuration and a power transient occurs, the multiprocessor returns to nominal state, i.e., no memory redundancy switching or no switched-in memories and memories 24 and 26 in the protected state to prevent any write operation. With the resumption of normal power supply conditions, processors 10 and 12 are automatically cleared and initiated and begin executing instructions starting from location 0 in memory 24.

Both processors 10 and 12 execute the same program starting at location 0 in memory 24 for restart of the multiprocessor system 8. Processors 10 and 12 can be directed to separate programs through the use of hardware conditional branch instructions. For example, memory 24 may store information designating either processor 10 or 12 as the master and the other processor as the slave. One problem during start-up in multiprocessor system 8 is that all the registers and all of the processors have been cleared and no processor knows its identity unambiguously. One means for determining the identity of a processor after a power transient or a restart after power has been turned on is for the processor to make a "who am I" request to input/output 14. Input/output 14 would provide an input code back to the processor which unambiguously identifies the processor making the request "who am I." This code can be determined, for example, by determining on which line the request comes from the processor such as line 17 or 18. The processor making the request "who am I" would receive the code back from the input/output 14 and compare this code with a code stored in the program memory, memory 24 which designates the master before power shutdown. If the processor is a master, the processor or master will halt and clear the other processor. If the processor is not the master, it will halt itself. The master or the processor once identified as the master will jump to the FIT control program in memory 26 and start or resume the test of the slave or processor under test.

Figure 4:
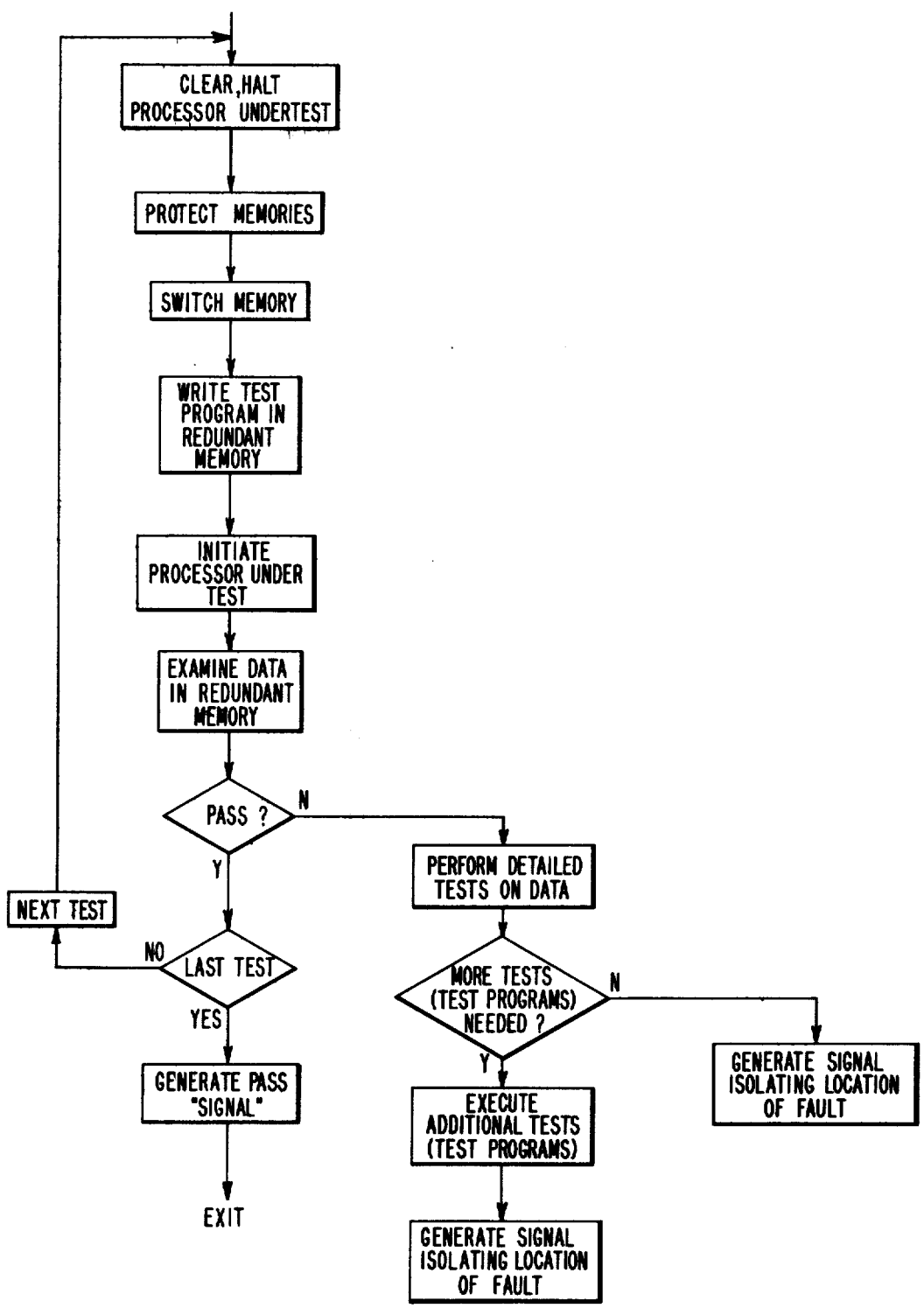
FIG. 4 is a flow chart demonstrating a method for fault isolation test utilizing the embodiment shown in FIG. 1.

FIG. 4 shows a flow chart demonstrating a method for fault isolation test utilizing the embodiment shown in FIG. 1.

We claim:

1. A multiprocessor system to facilitate fault isolation test upon one of its processors by another comprising:
   a first, second, and third memory each having a plurality of memory address locations for storing a plurality of instructions and data;
   a first and second digital processor, each said processor operative to execute instructions and operate upon data stored in at least one of said memories, each said processor having an input/output port responsive to control signals including halt, initiate, clear and interrupt commands, and at least one port for transferring data and instructions;
   a transfer switch coupled to each of said memories and processors for transferring instructions and data between said memories and said port of said first and second processors, said transfer switch including means for switching said third memory in place of said first memory in response to a memory switching command signal and for causing said first memory at times when replaced by said third memory to be inaccessible by said first and second digital processors to protect the integrity of the information stored in said first memory;
   said means for switching includes means for addressing said third memory by an address directed to said third memory and by an address directed to said first memory at times when replaced by said third memory,
   said transfer switch including means for protecting the information in said second memory in response to a memory protection command signal while permitting information to be read from said second memory;
   an input/output means coupled to said input/output port of said first and second processors for receiving, decoding and generating initiate, halt, clear and interrupt command signals and for receiving and decoding "who am I" identification request, memory switching and memory protection command signals, said input/output means coupled to a control input of said transfer switch for providing memory switching and memory protection command signals.

2. The multiprocessor of claim 1 wherein:
   said first and second digital processors each are operative to reset all its registers to zero in response to said clear command signal.

3. The multiprocessor of claim 1 wherein:
   said first and second digital processors each are operative to cause an instruction to be fetched and executed in response to said initiate command signal.

4. The multiprocessor of claim 1 wherein:
   said first and second digital processors each are operative to halt the fetching and the execution of instructions in response to said halt command signal and operative to fetch and execute one instruction only in response to the presence of both said initiate and halt command signals.

5. A method for performing fault isolation test on a first processor by a second processor within a multiprocessor system including a plurality of processors and a plurality of memories comprising the steps of:
   halting and clearing said first processor;
   switching in a first memory in place of a second memory for use by said first processor under test, said second memory containing a start-up program for said multiprocessor system;
   writing a test program including at least one instruction into said first memory, said test program beginning at a predetermined address;
   initiating said first processor including the steps of reading an instruction from said first memory at said predetermined address and executing said instruction;
   comparing the data in said first memory in at least one address location with first predetermined data to detect an error indicative of a fault in said first processor; upon detection of an error, comparing the data in said first memory with additional predetermined data in response to detection of an error to isolate the location of a processor fault capable of causing said error; and
   generating a predetermined signal indicative of the location of said fault.

6. A method for performing fault isolation test on a first processor in a multiprocessor system including a plurality of processors and a plurality of memories by a second processor comprising the steps of:
   halting and clearing said first processor;
   switching in a first memory in place of a second memory for use by said first processor under test, said second memory containing a start-up program for said multiprocessor system;

writing a test program including at least an instruction into said first memory, said test program beginning at a predetermined address;

initiating said first processor including the steps of reading an instruction from said first memory at said predetermined address and executing said instruction;

comparing the data in said first memory in at least one address location with first predetermined data to detect an error indicative of a fault in said first processor;

upon detection of no error, writing another test program including at least an instruction into said first memory;

initiating said first processor including the steps of reading an instruction from said first memory and executing said instruction;

comparing the data in said first memory in at least one address location with second predetermined data to detect an error indicative of a fault in said first processor; and upon detection of no error, generating a predetermined signal indicative of no fault located.

7. A method for performing fault isolation test on a first processor in a multiprocessor system including a plurality of processors and a plurality of memories by a second processor comprising the steps of:

halting and clearing said first processor;

switching in a first memory in place of a second memory for use by said first processor, said second memory containing a start-up program for said multiprocessor system;

writing a test program into said first memory beginning at a predetermined address; said test program including at least one instruction;

initiating said first processor including the steps of reading an instruction from said first memory at said predetermined address and executing said instruction;

halting by a control signal from said second processor said first processor after execution of said test program; and comparing the data in said first memory in at least one address location with first predetermined data to detect an error indicative of a fault in said first processor.

8. The multiprocessor of claim 1 wherein said means for protecting the information in said second memory includes means for inhibiting write operations in said second memory.

9. The multiprocessor of claim 1 wherein:

said first and second digital processors each are operative to execute instructions including add, subtract, load, store, input, output, NAND, conditional branch and shift instructions.

* * * * *